United States Patent Office 2,725,203
Patented Nov. 29, 1955

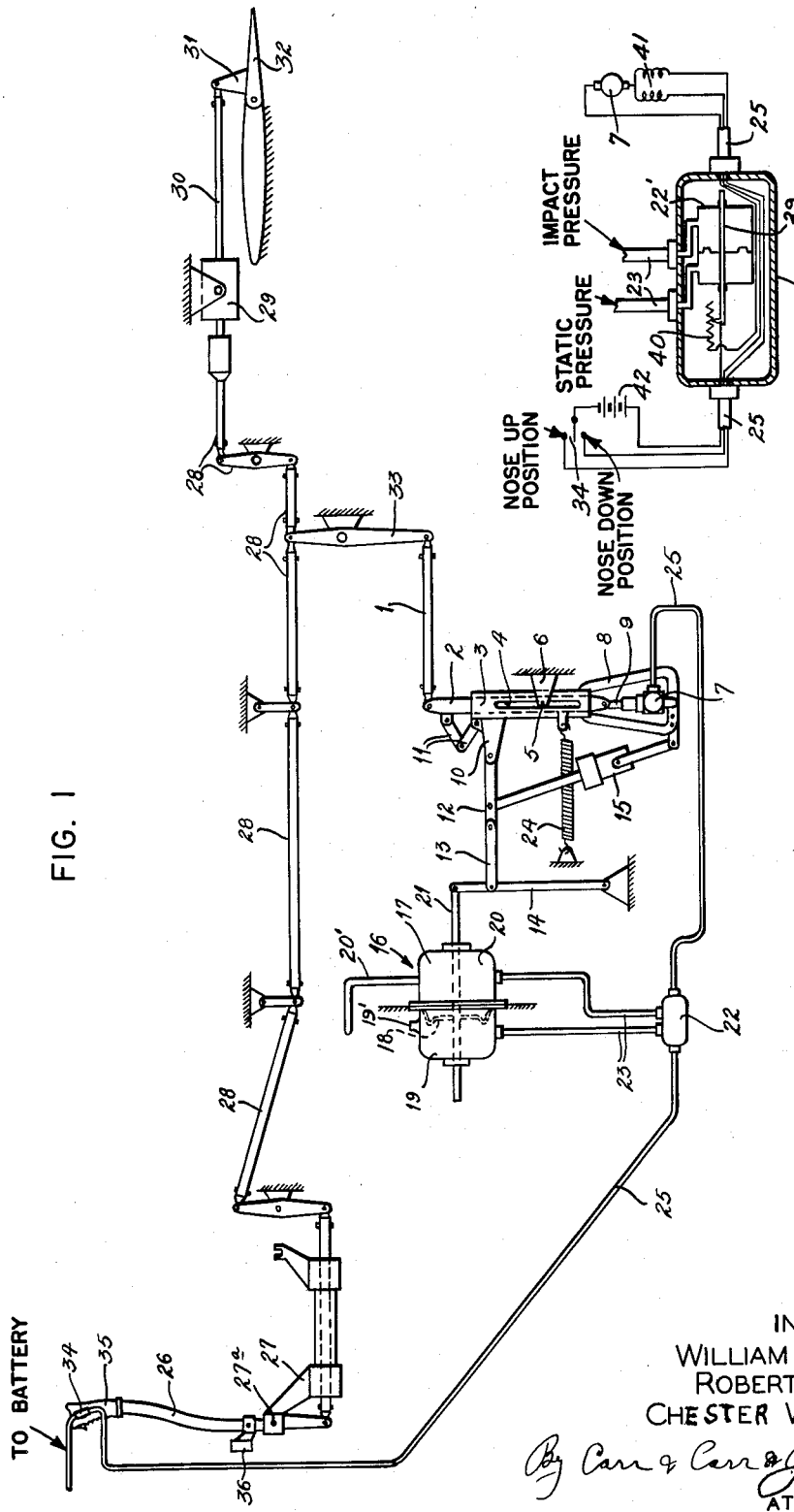

2,725,203

AIRCRAFT CONTROL SYSTEM WITH ARTIFICIAL FEEL

William Joseph Blatz, Overland, Robert Howard Belt, Kirkwood, and Chester William Miller, Florissant, Mo., assignors to McDonnell Aircraft Corporation, St. Louis, Mo., a corporation of Maryland Application June 21, 1951, Serial No. 232,768

6 Claims. (Cl. 244—83)

This invention relates to aircraft control systems and is more particularly directed to a device for delivery of a stable and satisfactory stick force characteristic to the pilot under all flight conditions. It is intended to be used when the flight control surface is power-actuated or otherwise actuated in such a manner that negligible surface actuation loads feed back to the pilot's control stick. Longitudinal control forces in aircraft are conventionally considered stable when a pull force on the control stick by the pilot causes either a reduction in air speed from a trimmed air speed or a positive increment in the load factor acting on the airplane and, conversely, when a push force by the pilot causes an increase in air speed from a trimmed air speed or a negative increment in load factor acting on the airplane.

Longitudinal control forces may be considered satisfactory if they are stable in direction and of such magnitude as to be acceptable to the pilot under all flight conditions. Experience has shown that to be considered acceptable, longitudinal stick forces in steady maneuvers should increase continuously with an increase in normal load factor acting on the aircraft; and the gradient of stick force versus load factor should be reasonably constant throughout the range of variation of load factor and air speed. When the airplane response lags during sudden accelerated maneuvers, the control motion and the force per unit control deflection should be greater than the steady maneuver force per unit control deflection gradient, thus providing an anticipation of the resulting airplane motion which, in turn, will reduce overcontrolling tendencies. It is also necessary that the pilot should be able to trim the stick force to zero at any steady flight speed; and it is desirable that the trim stick force gradient, in other words, the gradient of stick force versus air speed in steady unaccelerated flight, be somewhat greater at low speeds than at high speeds, and the pilot's trim control be more sensitive at low speeds than at high speeds.

It has also been demonstrated that an aircraft in which the stick forces are stable in direction and acceptable in magnitude, may be considered satisfactory by the pilot even though the aircraft itself is somewhat unstable, as evidenced by a reversal in direction of stick motion for accomplishing a change in speed. For example, a pilot will tolerate a slight aft motion of the control stick as the speed increases in a dive, provided the control forces are such that he might still push forward on the stick with increasing force as the speed increases.

Heretofore artificial "feel" systems included features which made the direction and magnitude of the stick force essentially dependent upon the direction and magnitude of the control stick motion. Thus an airplane exhibiting instability in control stick motion, would also exhibit instability in control forces. It is very difficult, if not impossible, in the case of high speed aircraft, to design an airplane in such a manner that the stick motion will be stable under all flight conditions and, therefore, such artificial "feel" systems are not entirely satisfactory.

One of the objects of the invention is to provide mechanism that will supply to the stick of an airplane, force which varies in response to air speed changes from any given trim air speed, said force being made effectively independent of the stick force arising from changes in the normal load factor acting on the airplane, the force being so regulated that its gradient with respect to air speed is stable in direction and of desirable magnitude throughout the permissible flight speed range of the aircraft. This force is made effectively independent of the control stick position or dependent upon the control stick position to any degree considered desirable.

Another object of the invention is to provide mechanism by which the stick force of an aircraft in response to longitudinal or flight control in steady flight may be trimmed to zero at any desired air speed throughout a permissible speed range of the aircraft, the mechanism incorporating a device as an optional feature for varying the sensitivity of the trimming device as a function of the indicated air speed.

A further object of the invention is to provide mechanism which, during steady maneuvers, will supply a force to the flight control stick of an airplane that is capable of exhibiting a stable gradient with respect to the change in normal load factor acting on the aircraft, the force being made to act independently of any changes in force caused by changes in air speed, and in which the force can be made independent of the displacement of the control stick from its trimmed position; or dependent upon the displacement of the control stick from its trimmed position to such a degree as may be considered desirable.

A still further object of the invention is to provide mechanism capable of supplying a momentary control stick force during suddenly imposed maneuvers exhibiting a stable gradient with respect to the normal load factor acting on the airplane, said force being additive to but independent of the force resulting from the normal load factor, the force also being dependent upon the position and rate of travel of the longitudinal control stick and upon the magnitude of the indicated air speed such that the force increases with increasing indicated air speed, stick displacement, and rate of stick displacement from its trimmed position.

In the drawing:

Fig. 1 is a schematic view of a typical aircraft control system to which an embodiment of the present invention is added to produce the "feel" effect for the pilot; and, Fig. 2 is a diagrammatic and sectional view of the control circuit and transducer means shown in Fig. 1.

The invention embodied in the structure illustrated in the drawing includes means connected in parallel with the longitudinal control system consisting of a plurality of connecting links 28. One end of each system is connected to a control stick 26 pivoted to a support 27 by means of a pivot pin 27a. The other end of the system is connected to an irreversible power cylinder 29, the output side of the cylinder being connected to a push rod 30 pivoted to a horn 31 secured to a control surface, such as an elevator 32. A bellcrank or lever 33 is pivoted to the aircraft frame, one end thereof being connected to the push rod 1 and the other end inserted between the adjacent ends of the system of links 28. The invention includes the push rod 1 connected to a control rod 2 pivoting about trunnion pin 5 extending through slot 4 in the tubular member 3. The trunnion is appropriately mounted on a portion of the aircraft frame and the tubular member 3 is slidably mounted on control rod 2. The trim actuator 7 is connected to control rod 2 by means of connecting link 9, and to the tubular member 3 by means of the trim actuator support 8.

A centering link 10 is secured to one end of the tubular member 3 and a damping link 12 is pivoted to the centering link 10 and to a closing link 13. The closing link is pivoted to an idler arm 14 which, in turn, is pivoted to the aircraft frame. A damping member 15 is connected between the trim actuator support 8 and the damping link 12. Torque resisting scissor links 11 are connected to the control rod 2 and tubular member 3 for preventing twisting of the tubular member with respect to the rod.

A bellows assembly 16, consisting of a container 17 and a diaphragm 18 therein which divides the container into chambers 19 and 20, is associated with the mechanism described in the following manner. A rod 21 is secured to the diaphragm and is slidably mounted in suitable bushings provided in the end walls of the container. The rod is pivotally connected to the idler arm 14. The chamber 19 is provided with an open port 19' so that the chamber is at ambient pressure, and chamber 20 is open at conduit 20' which has its outer open end located outside the aircraft so as to pick up the ram pressure effect due to velocity. Obviously the conduit 20' picks up static pressure also. The static pressure in chamber 19 and impact pressure in chamber 20 act to produce a net or resultant force in the direction of the static chamber 19 of which diaphragm 18 forms a part. A force is developed by the diaphragm proportional to the difference between the impact and static pressures acting thereon and, therefore, is approximately proportional to the square of the indicated air speed. This force is transmitted through the rod 21 to the idler arm 14.

A spring 24 is connected to the tubular member 3 below the trunnion pin 5 and anchored to the aircraft frame. The static and impact pressures are applied to the pressure transducer 22 by means of pressure fluid conducting conduits 23. The transducer is connected to the trim actuator 7 by means of electrical conductor 25. The conductor 25 has a manual trim switch 34 inserted therein located in the hand-grip 35 on the pilot's control stick 26. The switch 34 has three positions for controlling the forward and reverse operation of the actuator and for the open position of the switch. A bob-weight 36 is connected to the control stick 26 which produces a moment about pivot pin 27a. The forces developed in the artificial "feel" system are transmitted to the longitudinal control system consisting of links 28 and control stick 26 and thence to the pilot as a stick force, otherwise called a "feel" characteristic.

In Fig. 2, the transducer 22 contains a bellows device 22' with a spring influenced diaphragm separating the static and impact pressure chambers connected by the conduits 23 with the bellows device 16 (Fig. 1). The diaphragm in device 22' operates a rod 39 which determines the setting of the transducer rheostat 40. At one end of the transducer, the electrical conduit 25 leads to the actuator 7 where suitable provision is made in a split field 41 for reversing the actuator 7. The other end of the transducer has the electrical conduit 25 leading to the pilot control 26 where three position switch 34 is located. This switch has a toggle element normally in an open position and opposite contact positions, indicated as "nose up" and "nose down." When not manually held in either contact position, switch 34 returns to its open position. The conduit 25 (Fig. 1) leads from switch 34 to a suitable source of current, such as the battery 42 shown in Fig. 2. Whether or not the transducer is employed, the actuator means 7 shifts the tubular member 3 so that the effectiveness of the spring 24 can be varied as desired.

During normal trimmed unaccelerated flight, the moment about the artificial "feel" system bellcrank assembly tends to rotate said assembly about pin 5 in trunnion 6 by reason of the bellows assembly 16 and is balanced by the moment due to the artificial "feel" system spring force. The force of spring 24 is applied to the tubular member 3 on the opposite side of the trunnion point about which the force of bellows 16 is applied to the tubular member. The force of the bellows diaphragm 18, derived from the resultant static and impact pressures, is applied to rod 21 and, in turn, to idler arm 14 and links 10, 12 and 13. The force of spring 24 is substantially constant since a very low spring rate is used and provides the Bungee hereinafter described. Any change in air speed is reflected in the artificial "feel" system as a change in the moment about the bellcrank assembly trunnion pin 5. This change in moment about the trunnion pin is caused by one or both of the following factors:

(1) The force of the bellows changes because it is a function of the indicated air speed squared; and (2) The moment arm of the bellcrank may change.

This change in moment arm is effected by rotation of the bellcrank system about the trunnion pin 5 caused by the normal stable or abnormal unstable change in the position of the airplane trim surface which results in a change in the line of action of the force of the bellows 16 in closing link 13. In the case of neutral aircraft stability, there is no change in the trim surface position for air speed changes, therefore, there is no change in the moment arm of the bellows force.

The change in air speed and the corresponding change in the "feel" system moment makes it necessary for the pilot to apply stick force for trimming the airplane. The rigging of the artificial "feel" system into the longitudinal control system is such that an increase in air speed from any trim air speed condition, requires a push force on the longitudinal control stick for maintaining the trim; or a decrease in air speed from any trim condition, requires a pull force on the longitudinal control stick. This variation in longitudinal trim stick force with air speed from a trim air speed condition, produces a normal "feel." The longitudinal trim stick force variation with air speed from any trim air speed condition is obtained from two factors:

(1) Dynamic pressure change, a function of the longitudinal stick force that is a product of the change in dynamic pressure times the trim moment arm, the latter being regulated by trim dynamic pressure balanced by the Bungee; and (2) Normal centering, or a longitudinal stick force proportional to both control surface position and the dynamic pressure.

The Bungee contribution to the longitudinal trim stick force characteristics is to regulate the effective moment arm of the bellows force to produce the desired force variation with dynamic pressure changes. The centering contribution to the longitudinal trim stick force characteristics is a function of the length of the centering link 10 in percent to the combined length of the centering link 10, the damping link 12, and the closing link 13. Therefore, it will be observed that any degree of either contributor to the longitudinal trim stick force characteristics, can be used in obtaining satisfactory stick force characteristics. The degree of Bungee and of centering used is a function of the longitudinal trim stability characteristics. Since both contributors to the trim stick force characteristics are based on widely different principles, it is possible to provide a stable or normal variation in longitudinal trim stick force with air speed from any trim air speed regardless of the longitudinal stability characteristics of the aircraft as indicated by the variation in stick position with air speed.

The trim actuator 7 is used for trimming the "feel" system by balancing the moments about the bellcrank assembly trunnion pin 5. A retraction or extension of the trim actuator causes the tubular member 3 to slide relative to the control rod 2, thereby re-adjusting the moment arm of the bellows system and of the spring force until the moments about the trunnion pin 5 are balanced.

The use of a variable trim speed actuator is optional since its use is affected by the operating speed range of the airplane coupled with the longitudinal stability characteristics. The normal functioning of this variable speed feature is such that the trim actuator speed is relatively high at low indicated air speeds when relatively large movements of the trim actuator are required for changing trim speeds. The trim actuator speed is relatively low at high indicated air speeds when relatively small movements of the trim actuator are required for changing the trim speeds. This trim actuator speed is varied inversely as a function of the dynamic pressure for accomplishing this result. The transducer 22 controls the voltage available to the trim actuator 7 by varying the resistance of the circuit comprising the electrical conductor 25 in response to the pressure imposed on the transducer, by which means the operating speed of the trim actuator is regulated, thereby increasing its operating speed as the air speed of the aircraft is decreased.

During normal accelerated flight, the motion of the pilot's control stick, control surface, and motion of the bellcrank assembly about the trunnion pin 5 is such that the centering characteristics of the "feel" system produce the pilot's stick force, tending to return the stick to its original position. Since the "feel" system centering characteristics are a function of the length of the centering link 10 in percent of the combined length of link 10, damping link 12, and the closing link 13, any amount of centering can be obtained for producing satisfactory maneuvering stick forces. However, a change in the amount of centering will also affect the longitudinal trim stick force variation previously discussed. Therefore, in the event only a small amount of centering is desired, provision is made for the installation of bob-weight 36 in the system, which produces a pilot's stick force proportional to the normal load factor acting on the aircraft. Its size and location may be adjusted for the purpose of bringing the maneuvering stick forces to a desirable level regardless of the degree of centering forces provided by the "feel" system.

The damper member 15 consists of a viscous damper which imposes a force on the damping link 12, said force tending to oppose rotation in either direction of the damping link with respect to the centering link 10, and said force being approximately proportional to the rate of rotation of the damping link with respect to the centering link. When the stick is moved slowly, the rate of rotation between the links is small and the damping force is negligible. As a result the damping link 12 will rotate freely with respect to the centering link 10 and be held in alignment with the closing link 13 by the action of the bellows force. However, when the stick is moved rapidly, the damping force will retard the rotation of the damping link with respect to the centering link 10 and it will rotate with respect to the closing link 13. Rotation between the damping link 12 and the closing link 13 has the same effect as increasing the length of the centering link 10 and consequently provides an increased centering force on the stick. This increased centering force will reduce any tendency of the pilot to overcontrol in quick maneuvers due to lag in response of the airplane to rapid stick motion.

The aircraft equipped with the above artificial "feel" system is assumed to be in normal flight. The pilot moves the stick 26 in a given direction which moves the linkage connected to the actuator 29 for ultimately adjusting the control surface 32. Under some conditions the pilot may want the stick to react in a given way or produce a "feel" so that he will be aware of an adjustment being made or one to be made. This artificial "feed" is created by the bellows system 16 which responds to static and impact pressure changes. If the pilot does not resist the stick when a change in air speed is experienced by the airplane, the bellows system 16 will actuate the linkage connected to the plunger rod of the bellows system and move the tubular member 3 and control rod 2, which will move the longitudinal control device 32 through the longitudinal control system links 28 to restore the aircraft to its original air speed. If the pilot indicates a change in air speed by deflecting the control stick, a resulting force is imposed on the control stick by the change in moment about trunnion pin 5 caused by a bellows force change unbalanced by the Bungee. This force change gives the pilot a reference to the amount of change in air speed. If the pilot desires to fly at the resultant speed, the actuator 7, which is operated by switch 34, moves the tubular member 3 on control rod 2 with respect to trunnion point 5 until the Bungee balances the bellows system force.

The bellows system also acts on transducer 22 included in the circuit for the actuator. The transducer regulates the rate of trim action after the actuator circuit has been closed by switch 34. This rate is controlled regardless of the direction of operation of the actuator.

What we claim is:

1. An artificial feel system for aircraft comprising a longitudinal flight control system for an aircraft control surface, a manually operable lever for actuating the system and surface, a rod operatively connected to said flight control system, a tubular member slidably receiving said rod and having a slot therein, a trunnion, a pin in said trunnion extending through said slot in the tubular member and connected to said rod, a spring connected to and tending to rotate said tubular member in one direction about said pin, bellows means for placing static pressure and aircraft velocity impact pressure in opposition to each other, means connected to said bellows and tubular member for applying the resultant of said static and impact pressures to said tubular member to move the latter in a direction about said pin opposite to said spring; and means connected to said tubular member for causing said tubular member to move relative to said rod for varying the effectiveness of said spring in balancing the resultant of impact and static pressures and for imposing force on said system and lever.

2. An artificial feel system for aircraft comprising a longitudinal flight control system for an aircraft control surface, a manually operable lever for actuating the system and surface, a rod, means for connecting said rod to said flight control system, a tubular member slidably receiving said rod, means for pivotally supporting said rod with said tubular member thereon, a spring connected to said tubular member tending to rotate said tubular member in one direction about the pivotal support thereof, means carried by the aircraft for placing static and impact pressures in opposition to each other, movable means in said last means connected to said tubular member for applying the resultant of static and impact pressures to said rod in opposition to said spring; and means connected to said tubular member to move the latter relative to said rod for varying the distance between the point of application of the spring force or the resultant force to the rod pivotal support and for imposing force on said system and lever.

3. An artificial feel system for aircraft comprising a longitudinal flight control system for an aircraft control surface, a manually operable lever for actuating the system and surface, a rod, means for connecting said rod to said flight control system, a tubular member slidably receiving said rod, trunnion means for pivotally supporting said rod and tubular member, a trim actuator connected to and adapted for axially moving said tubular member supported on said rod, a spring connected to said tubular member for rotating said tubular member about its trunnion in one direction, means carried by the aircraft for sensing impact and static pressures and including a flexible member movable in response to the resultant of said pressures, a rod connected to said flexible member in said last mentioned means, a pivoted lever connected to said last mentioned rod, a series of pivotally connected links connected between said lever and said tubular member at one side of said trunnion means for rotating said tubular member, said trim actuator being adapted for changing the point of pivoting with respect to said resultant force and said spring and for imposing force on said system and lever, damping means connected between one of said series of pivoted links and said tubular member; and control force transmitting means connected to said actuator, said last means being responsive to static and impact pressures and being adapted to transmit a force proportional to the resultant of the static and impact pressures to said actuator for controlling the speed of operation of said actuator.

4. An artificial feel system for aircraft comprising a flight control surface, manually-operated means for controlling said surface, actuating means connected to said manual means and to said surface for transmitting control forces from said manual means to said surface, a bellows device in the aircraft for placing static and impact pressures in opposition to each other, a pivotally mounted telescopically associated rod and tube, force transmitting means operably connected to said bellows device and to said tube for transmitting and applying the resultant force of the static and impact pressures to said tube, an actuator connected to and adapted to move said tube, means connected to said bellows device to be influenced responsive to the static and impact pressures, said last means being adapted to produce a force which is the resultant of the static and impact pressures and being connected to and adapted to transmit such force for controlling said actuator for biasing the action of said resultant force from said bellows device upon said tube, spring means connected to said tube for biasing the action of said resultant force; and means connected between said rod and said actuating means for imposing the resultant of said bellows force and said spring force on said manually-operated means for producing a "feel" therein.

5. An artificial feel system for aircraft comprising a flight control surface, manually-operated means for controlling said surface, actuating means connected to said surface and to said manually-operated means for transmitting the manual control forces to said surface, two members capable of movement relative to each other along a common axis, means operably connecting one of said two members to said manual control force actuating means, means for pivotally supporting said members, a bellows device in the aircraft for placing static and impact pressures in opposition to each other, means connecting said bellows device to the other of said two members at one side of said pivot support for applying the resultant of said static and impact pressures to said other member, actuating means connected to said other one of said two members and adapted to relatively move said members, transducer means connected to said bellows device to be responsive to the impact and static pressures and being adapted to produce a force which is the resultant of the static and impact pressures, said transducer means being operably connected to said actuating means for controlling the speed of said actuating means in response to said resultant force for biasing said bellows device, and spring means connected to said other member for biasing the action of said bellows device; the resultant biasing action of said spring means and said bellows device affecting said manually-operated means for producing a "feel" therein.

6. An artificial feel system for aircraft comprising a flight control surface, manually-operated means for controlling said surface, actuating means connected to said manual means and to said surface for transmitting the manual control to said surface, a bellows device in the aircraft for placing static and impact pressures in opposition to each other, a pivotally mounted telescopically associated rod and tube in the aircraft, means connecting said rod and said actuating means to pivotally displace said rod and tube, a series of pivoted links connected to said bellows device and to said tube at one side of its pivot for applying the resultant force of the static and impact pressures to rotationally displace said tube, an actuator connected to said tube and adapted to telescopically shift the tube relative to said rod, transducer means adapted to transmit control force which is the resultant of static and impact pressures, said transducer means being connected to said actuator for controlling said actuator for biasing the action of said resultant force from said bellows device and imposing a "feel" in said actuating means, spring means connected to said tube at the opposite side of its pivot for biasing the action of said resultant force from said bellows device; and means connected with said series of links for damping the action of one of the series of pivoted links connecting said bellows to said tube.

References Cited in the file of this patent

UNITED STATES PATENTS

| | | |
|---|---|---|
| 1,897,285 | Veit | Feb. 14, 1933 |
| 2,205,610 | Van Ness | June 25, 1940 |
| 2,508,883 | Knowler et al. | May 23, 1950 |
| 2,548,481 | Knowler et al. | Apr. 10, 1951 |